March 20, 1928.

J. B. STROUD

EXTENSION STEP

Filed June 7, 1926

Inventor
John Bell Stroud

Patented Mar. 20, 1928.

1,663,321

UNITED STATES PATENT OFFICE.

JOHN BELL STROUD, OF PASS CHRISTIAN, MISSISSIPPI.

EXTENSION STEP.

Application filed June 7, 1926. Serial No. 114,353.

The object of my invention is to accommodate passengers entering and leaving passenger coaches.

Owing to obstructions along highways, steps of vehicles are necessarily high, causing inconvenience to passengers. My invention obviates this deficiency by the use of an extra step, adjustably disposed below the rigid or fixed step of passenger vehicles.

The invention is shown and described in a specific embodiment, to which however, it is not to be restricted, the right is reserved to make such changes or alterations as the actual reduction to practice may suggest in so far as such changes or alterations are compatible in spirit with the annexed claim.

My invention consists further in certain features of construction of parts which will be hereinafter described and pointed out in the claim, references being had to the accompanying drawings in which:

Figure 1:
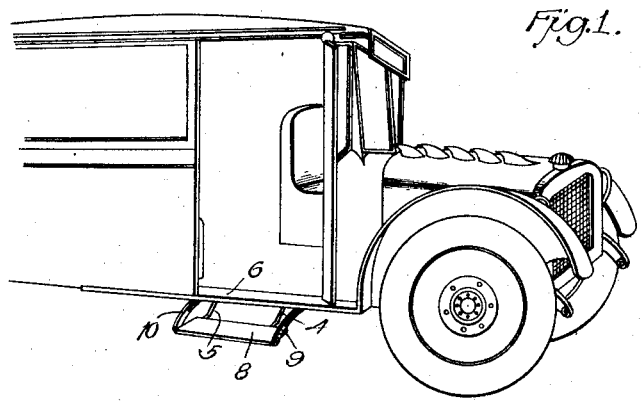
Figure 1 is a perspective view showing the forward end of a motor bus with the invention applied thereto and extended to operative position.
Figure 2:
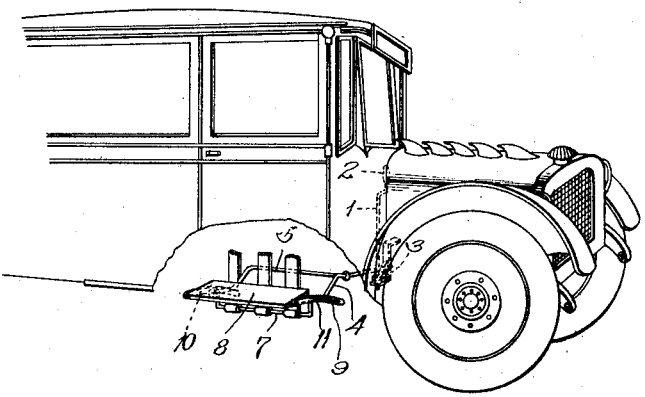
Figure 2 is a view similar to Figure 1 but broken away to disclose the invention which in this figure is shown in folded or retracted position.
Figures 3, 4:
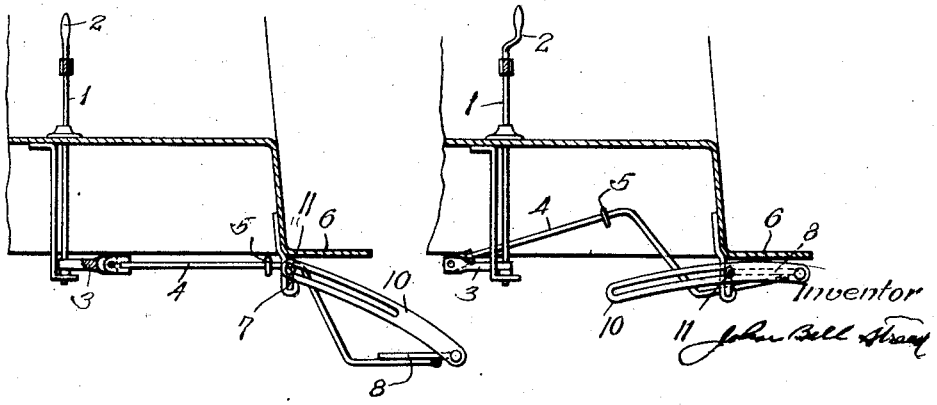
Figures 3 and 4 are transverse sectional views through the vehicle in vertical planes to the rear side of the step; showing the step in extended and retracted positions, respectively.

The step which is adapted for folding position beneath the body of the vehicle is actuated by means of a vertical shaft 1 to which angular or turning movement may be imparted by means of a crank 2 carried at its upper end. The shaft 1 is journaled in appropriate bearings in the floor of the vehicle and at its lower end carries a lateral arm 3 which has a universal connection with one end of an angular or generally Z-shaped arm 4, the forward or outer end of which supports the step at one side. A similarly shaped arm 5 supports the step at the other end but its extremity is bent laterally to parallel the step and connect with the first arm at an intermediate point. By means of this construction, the lateral arm 3 is operatively connected to the step at both sides of the latter.

Disposed directly below the rigid or fixed step 6 of the vehicle and at the rear edge of the latter is a transverse hanger bar 7 over which the arms 4 and 5 slide in the extension and retraction of the extensible step 8.

The extensible step at the ends and adjacent the forward edge has connected with it the arcuate brace members 9 and 10 which are slotted longitudinally, the step 6 at the rear edge carrying laterally projecting pins 11 extending through said slots.

In the extended or forward portion of the extensible step, the pins 11 abut the remote ends of the slots in the brace members 9 and 10 and thus the forward edge of the extensible step is supported, the rear edge and intermediate portions of the extensible step being supported by the Z-bars 4 and 5 which are in turn supported by the transverse bar 7. In the retraction of the extensible step, angular or turning movement of the shaft 1 will swing its arm 3 around to exert a pull on the arm 4 and through the latter on the arm 5, the inclined portions of these arms sliding over the transverse bar 7 and thereby raising the extensible step as well as retracting it, until the latter assumes a position just below the fixed step 6. The brace members, during this operation, are caused to slide back and such movement is permitted by reason of the pin and slot connections with the fixed step.

The invention having been described, what is claimed as new and useful is:

In combination with a fixed step, an extensible step, Z-shaped arms supporting the extensible step, a transverse bar secured to the fixed step at the rear edge of the latter, said arms bearing upon and being slidable over said bar, and means for imparting longitudinal movement to said arms, said means comprising a vertical shaft provided with a turning crank, and a lateral arm at the lower end of the shaft having a universal connection with one of the first said arms, both of the first said arms being connected together beyond said universal connection.

JOHN BELL STROUD.